US009367897B1

(12) United States Patent
Chen et al.

(10) Patent No.: US 9,367,897 B1
(45) Date of Patent: Jun. 14, 2016

(54) SYSTEM FOR VIDEO SUPER RESOLUTION USING SEMANTIC COMPONENTS

(71) Applicant: Sharp Laboratories of America, Inc., Camas, WA (US)

(72) Inventors: Xu Chen, Vancouver, WA (US); Anustup Kumar A. Choudhury, Vancouver, WA (US); Christopher Andrew Segall, Vancouver, WA (US); Petrus J. L. Van Beek, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 14/567,891

(22) Filed: Dec. 11, 2014

(51) Int. Cl.
*G06K 9/32* (2006.01)
*G06T 3/40* (2006.01)
(Continued)

(52) U.S. Cl.
CPC ............ *G06T 3/4076* (2013.01); *G06K 9/48* (2013.01); *G06T 3/4007* (2013.01); *G06T 5/003* (2013.01); *G06T 5/50* (2013.01); *G06T 7/004* (2013.01); *G06T 7/0028* (2013.01); *G06T 7/0085* (2013.01); *G06T 7/204* (2013.01); *G06T 3/40* (2013.01); *G06T 2207/10016* (2013.01); *G06T 2207/20024* (2013.01);
(Continued)

(58) Field of Classification Search
CPC ....... G06T 3/4076; G06T 5/50; G06T 7/0028; G06T 7/004; G06T 7/204; G06T 2207/10016; G06T 2207/20024; G06T 2207/20182; G06T 2207/20221; G06T 2207/30201; G06T 5/003; G06T 3/4007; G06T 7/0085; G06T 3/40; G06T 3/403; G06K 9/48; G06K 9/6857; H04N 7/0142

USPC .................................................. 382/298–300
See application file for complete search history.

(56) References Cited

U.S. PATENT DOCUMENTS 7,656,950 B2    2/2010  Garrido et al.
7,978,346 B1 *  7/2011  Riza ..................... G01B 11/24
                                                        356/368

(Continued)

FOREIGN PATENT DOCUMENTS

EP          1445731 A2    8/2004
EP          2194445 A2    6/2010
JP        2011-171843 A   9/2011

OTHER PUBLICATIONS

Glasner et al., Super-Resolution from a Single Image, ICCV 2009, 8 pgs.

(Continued)

*Primary Examiner* — Kanjibhai Patel
(74) *Attorney, Agent, or Firm* — Chernoff Vilhauer McClung & Stenzel, LLP

(57) ABSTRACT

A method for increasing the resolution of a series of low resolution frames of a low resolution video sequence to a series of high resolution frames of a high resolution video sequence includes receiving the series of low resolution frames of the video sequence. The system determines a first plurality of semantically relevant key points of a first low resolution frame of the series of low resolution frames and determines a second plurality of semantically relevant key points of a second low resolution frame of the series of low resolution frames. The system temporally processes the first plurality of key points based upon the second plurality of key points to determine a more temporally consistent set of key points for the first plurality of key points.

16 Claims, 7 Drawing Sheets

(51) Int. Cl.
*G06T 5/50* (2006.01)
*G06K 9/48* (2006.01)
*G06T 7/00* (2006.01)
*G06T 7/20* (2006.01)
*G06T 5/00* (2006.01)

(52) U.S. Cl.
CPC ............... *G06T 2207/20182* (2013.01); *G06T 2207/20221* (2013.01); *G06T 2207/30201* (2013.01)

(56) References Cited

U.S. PATENT DOCUMENTS

| | | | |
|---|---|---|---|
| 8,023,561 | B1 | 9/2011 | Garrido et al. |
| 8,355,592 | B1 | 1/2013 | Shechtman et al. |
| 8,385,687 | B1* | 2/2013 | Blais-Morin ........... G06T 7/003 382/293 |
| 8,520,736 | B2 | 8/2013 | Topiwala |
| 8,903,139 | B2* | 12/2014 | Kim ................... G06K 9/00201 340/5.52 |
| 9,098,760 | B2* | 8/2015 | Saito .................. G06K 9/00228 |
| 2007/0103595 | A1 | 5/2007 | Gong et al. |
| 2013/0034299 | A1 | 2/2013 | Lin et al. |
| 2013/0034313 | A1 | 2/2013 | Lin et al. |

OTHER PUBLICATIONS

Sun et al., Image Super-Resolution using Gradient Profile Prior, CVPR 2008, 8 pgs.
Yang et al., Image Super-Resolution via Sparse Representation, IEEE TIP 2010, 13 pgs.
He et al., Single Image Super-Resolution using Gaussian Process Regression, CVPR 2010, 8 pgs.
Fattal, Image Upsampling via Imposed Edge Statistics, SGGRAPH 2007, 8 pgs.
Freeman et al., Example-Based Super-Resolution, IEEE Computer Graphics and Applications 2002, 10 pgs.
Tai et al., Super Resolution using Edge Prior and Single Image Detail Synthesis, CVPR 2010, 8 pgs.
Sun et al., Context-Constrained Hallucination for Image Super-Resolution, CVPR 2010, 8 pgs.
International Search Report, mailed Jan. 27, 2015, PCT International App. No. PCT/JP2014/005996, Sharp Kabushiki Kaisha, 4 pgs.
English Translation of Japanese No. JP2011-171843, Fujifilm Corp., entitled Image Processing Method and Apparatus, and Program, 52 pgs.

\* cited by examiner

SYSTEM FOR VIDEO SUPER RESOLUTION USING SEMANTIC COMPONENTS

CROSS-REFERENCE TO RELATED APPLICATIONS

None.

BACKGROUND OF THE INVENTION

Super resolution image processing generally refers to techniques that enhance the resolution of an image or a video. Super-resolution in image and video technology enables an increase in the resolution of a low resolution image or a low resolution video to, respectively, a high resolution image or a high resolution video. By way of example, a television may use an image up sampling technique to convert a standard definition video sequence to a high definition video sequence. Similarly, an image or video taken with a low resolution imaging device, such as a mobile phone, may be converted to a high resolution image or video, respectively.

Many super resolution techniques use two processing stages. The first stage includes multiple low-resolution images being registered with an image processing system, where one of the low-resolution images is selected as a primary image, and horizontal and vertical displacements of the rest of the low-resolution images (i.e., secondary images) are computed with respect to the primary image. The second stage includes the registered images being combined together to create a super resolution image using the displacement information and aliasing information present in the low resolution images. This technique may be extended to a series of images of a video sequence for a video. Unfortunately, there are limits to the effectiveness of super resolution techniques following this approach. Furthermore; the resulting video sequence tends to have visual temporal jitter when the super resolution process is applied to subsequent images in the video sequence in an independent manner, even if the image content is substantially stationary.

A system to accurately determine a high resolution frame from a sequence of low resolution frames becomes more complex when the imaged scene in the input sequence of low resolution frames changes, as is often the case with real-world recorded video sequences. Additional difficulties arise when objects in the imaged scene move in a non-planar manner, when objects change shape in a non-rigid manner, or when multiple objects move independently of each other: Such complex scene motion often leads to complex changes in the captured image sequence that complicate the above-mentioned super resolution techniques. A practical example of video with such complex changes are video sequences of human faces. Furthermore, factors related to the recording process itself may contribute to image degradation, and variations in the processing of the low resolution frames.

The foregoing and other objectives, features, and advantages of the invention may be more readily understood upon consideration of the following detailed description of the invention, taken in conjunction with the accompanying drawings.

DETAILED DESCRIPTION OF PREFERRED EMBODIMENT

Figure 1:
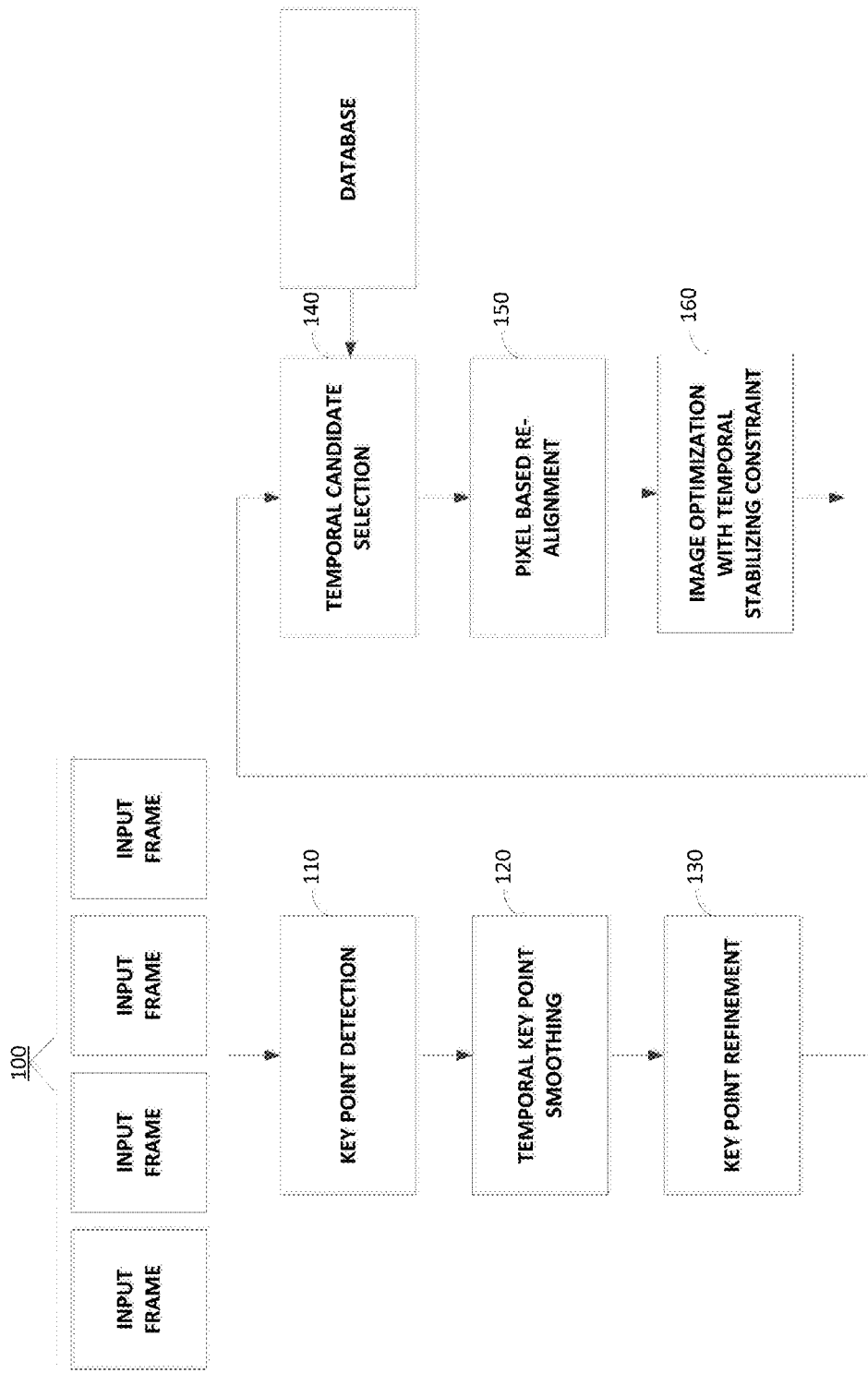
FIG. 1 illustrates a system for video enhancement.

Referring to FIG. 1, a super resolution video system may receive a series of low resolution input frames 100. Each of the series of input frames 100 represents one or more scenes of a video sequence, each temporally displaced from each other. Each of the frames may be processed by a key point detection process 110. Key points may correspond to landmarks of specific types of known objects or semantic components. As an example, a specific key point may correspond to the corner of a human eye, or to the tip of a human noise, or to another facial landmark. The locations of key points detected in each frame may be smoothed by a temporal key point filtering stage 120. The locations of key points detected in each input frame may be improved by a key point refinement stage 130. The super resolution system may utilize a database or dictionary of high resolution images of known objects or semantic components. The system may select from the database candidate image data 140 corresponding to specific semantic components present in the input frame. The selected candidate image data from the database is aligned with input image data using a pixel-based technique 150. High resolution image data from the database is utilized in a super resolution image enhancement stage 160 that includes a temporal stabilizing constraint and may be based on energy function minimization.

The key point detection process 110 may examine each pixel, or group of pixels, of each image to determine if there is a key feature present at that pixel or group of pixels. As a result, a set of pixels are identified for an image as being representative of key points of the image content. One exemplary type of key point detector is an edge detector, such as those pixels having a strong gradient magnitude. Another exemplary type of key point detector is a corner detector, such as those pixels which have a local two dimensional structure. Another exemplary type of key point detector is a blob (e.g., regions of interest), such as those pixels which have a smooth texture. Another exemplary type of key point detector is a ridge detector, such as a one-dimensional curve that represents an axis of symmetry. A number of other detectors may be used to identify the features, such as for example, a Canny detector, a Sobel detector, a features from accelerated segment test detector, a smallest univalue segment assimilating nucleus detector, a level curve curvature detector, a Laplacian of Gaussian detector, a difference of Gaussians detector, a determinant of Hessian detector, a maximally stable external regions detector, a principal curvature based region detector, and a grey level blobs detector. The detector may also uses local features such as histogram-of-gradients features, local binary features, or others. Key points that correspond to landmarks of known objects or semantic components may be located by detectors that are designed specifically for such objects, and/or trained in an off-line process involving labeled video data containing the known objects or semantic components. Furthermore, sets of key points may be detected and located in a joint manner, so as to optimally detect the entire object or semantic component, for example an entire human eye or an entire human face. Preferably, to maintain computational efficiency, each of the low resolution frames is processed independently of the other low resolution frames to determine the key points. However, with independent processing of the low resolution frames and accordingly no temporal information being used, such as motion detection information, inconsistency in the location of the key points in consecutive frames of substantially similar content may be present.

Figure 2:
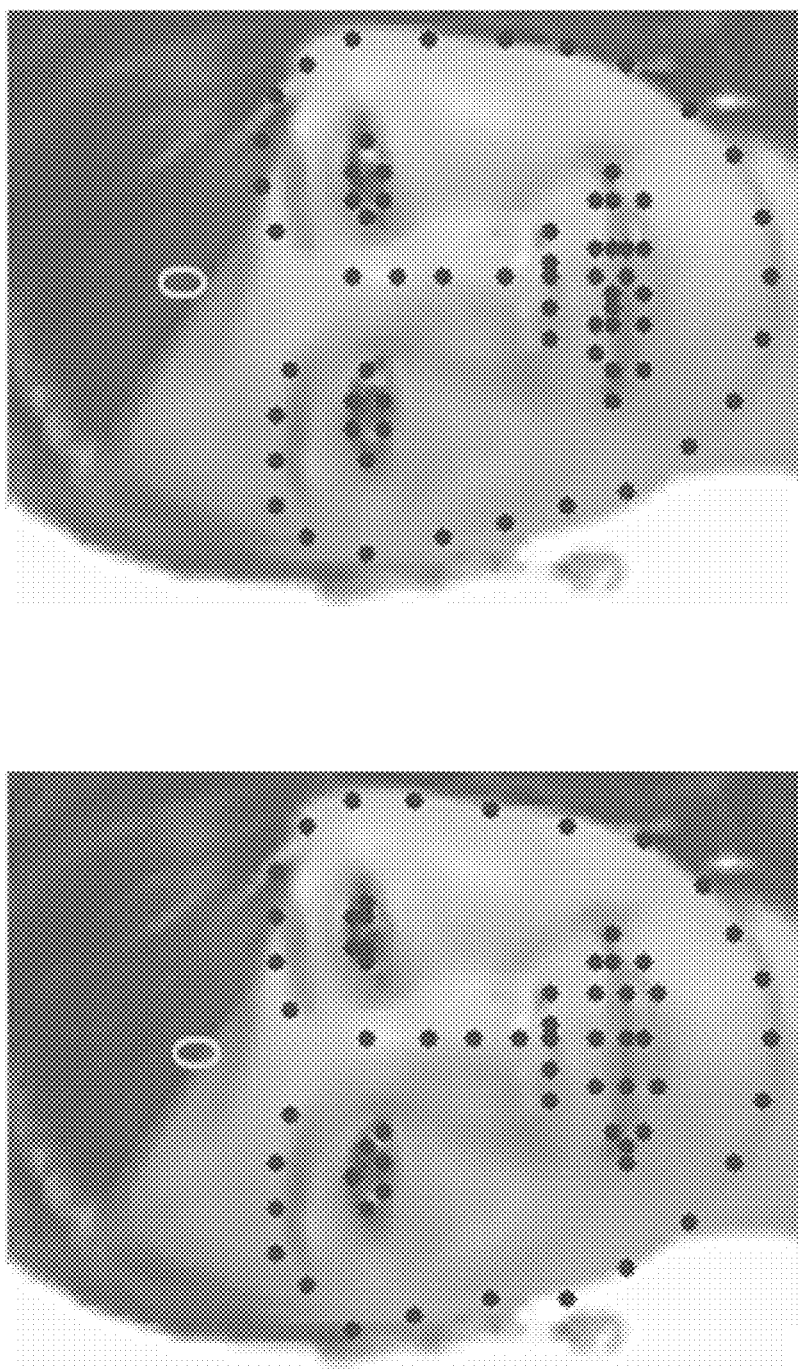
FIG. 2 illustrates key point detection on two frames.

Referring to FIG. 2, an illustration of substantially the same facial regions is shown. The result of the key point detection results in a set of key points on Frame K. Similarly, the result of the key point detection results in a slightly different set of key points on Frame K+1. The resulting super resolution technique using Frame K and frame K+1, such as a semantic based technique that may use a dictionary of candidate images, may result in the facial components being at a slightly different location for each frame. Consequently, although each independent frame which is increased in resolution may appear acceptable, the result of a video sequence of such resolution enhanced images may result in visually annoying temporal jitter.

Figure 3:
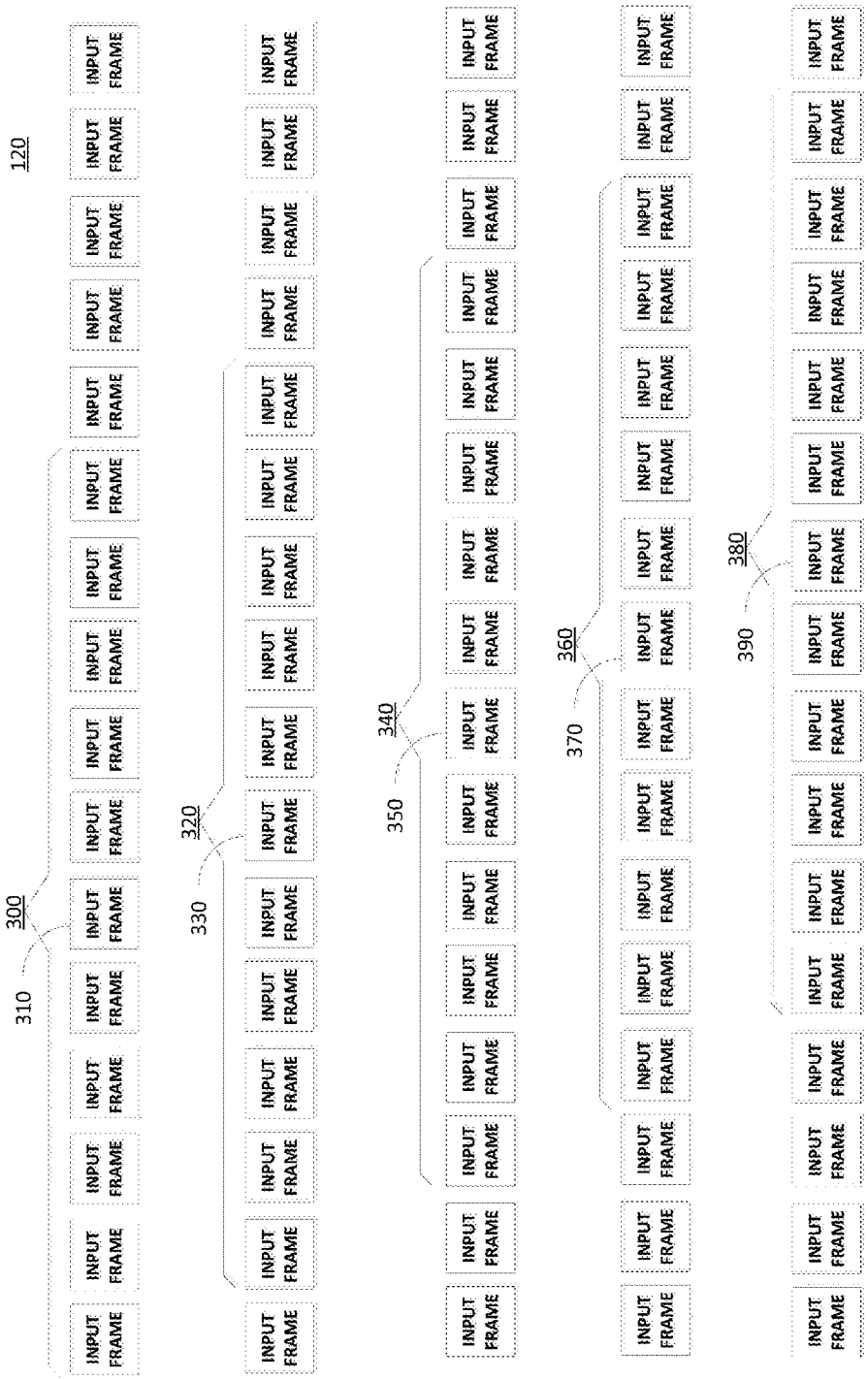
FIG. 3 illustrates temporal key point smoothing.

Referring to FIG. 3, to reduce the temporal jitter in situations where there is minimal movement or if the movement is generally in a linear direction, it is desirable to temporally filter the key points of the image 120. The temporal filtering may use a temporal window 300 around a current frame 310 (using one or more past frames and/or one or more future frames). The temporal filtering may compute a weighted average of the detected locations of all the key points in the window to determine the filtered key point locations for the current frame 310. By way of example, a temporal window of 11 frames may be used, with 5 past frames and 5 future frames. This process is repeated for subsequent frames and temporal windows 320, 330; 340, 350; 360, 370; 380, 390. The temporal filtering process may be applied in a recursive manner and utilize previously filtered key point locations as input to later filtering steps. In this case, the temporal filtering process may compute a weighted average of the detected locations of key points in a window around the current frame and previously filtered key point locations to determine the output. The result of temporal filtering is a video sequence with a reduction in temporal jitter and the process also results in an improved alignment of key points with underlying semantic components contained in the video data.

The temporal filtering of the key points improves the temporal consistency. However, when the motion of the components is sufficiently large the temporal filtering does not adequately address the temporal jitter since the temporal smoothing does not take the full information of the sequence of frames into consideration. Because the identification of the key points coming from individual frames is often not temporally consistent, the system may temporally track these key points in order to stabilize the spatial regions proximate the key points for enhancement. The system may attempt to temporally track all the key points in the image or the system may select semantically significant features (e.g., facial features, eyes, nose, ears, and mouth) of the image to temporally track key points of. By way of example, the feature points of semantic components (e.g. landmark points for four eye corners) may be tracked because there are usually rich features (e.g., strong edge information) around these landmark points in semantic components.

Figure 4:
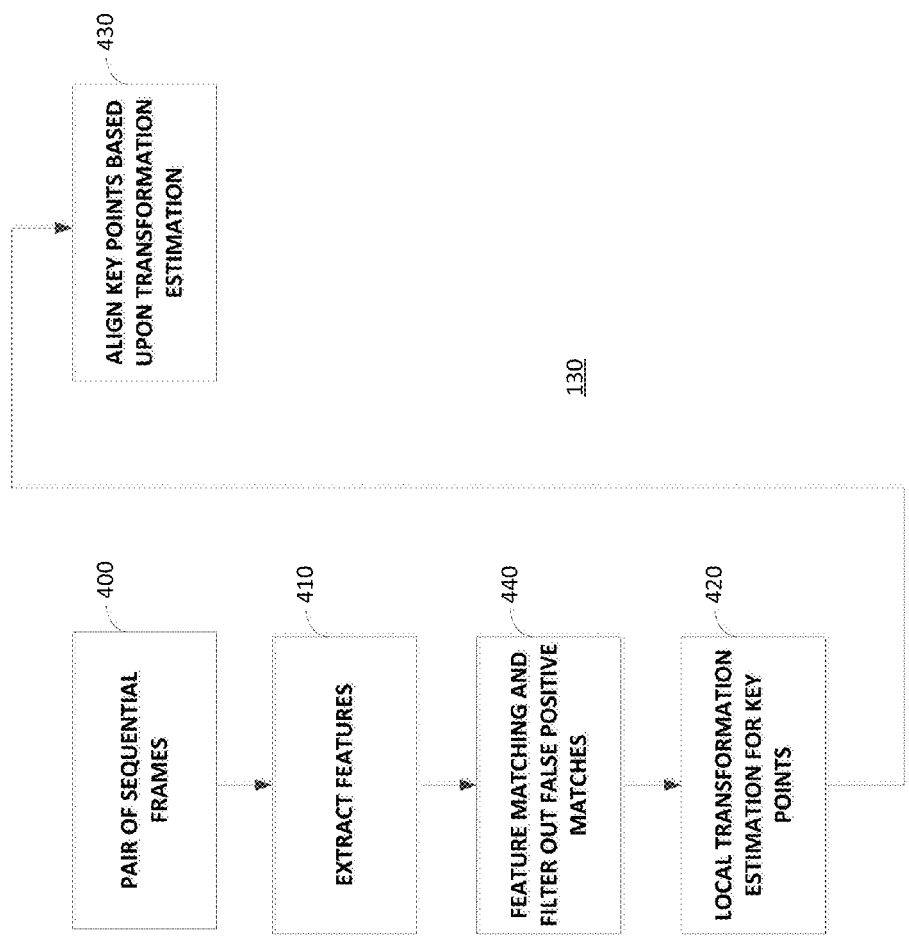
FIG. 4 illustrates key point refinement.
Figure 5:
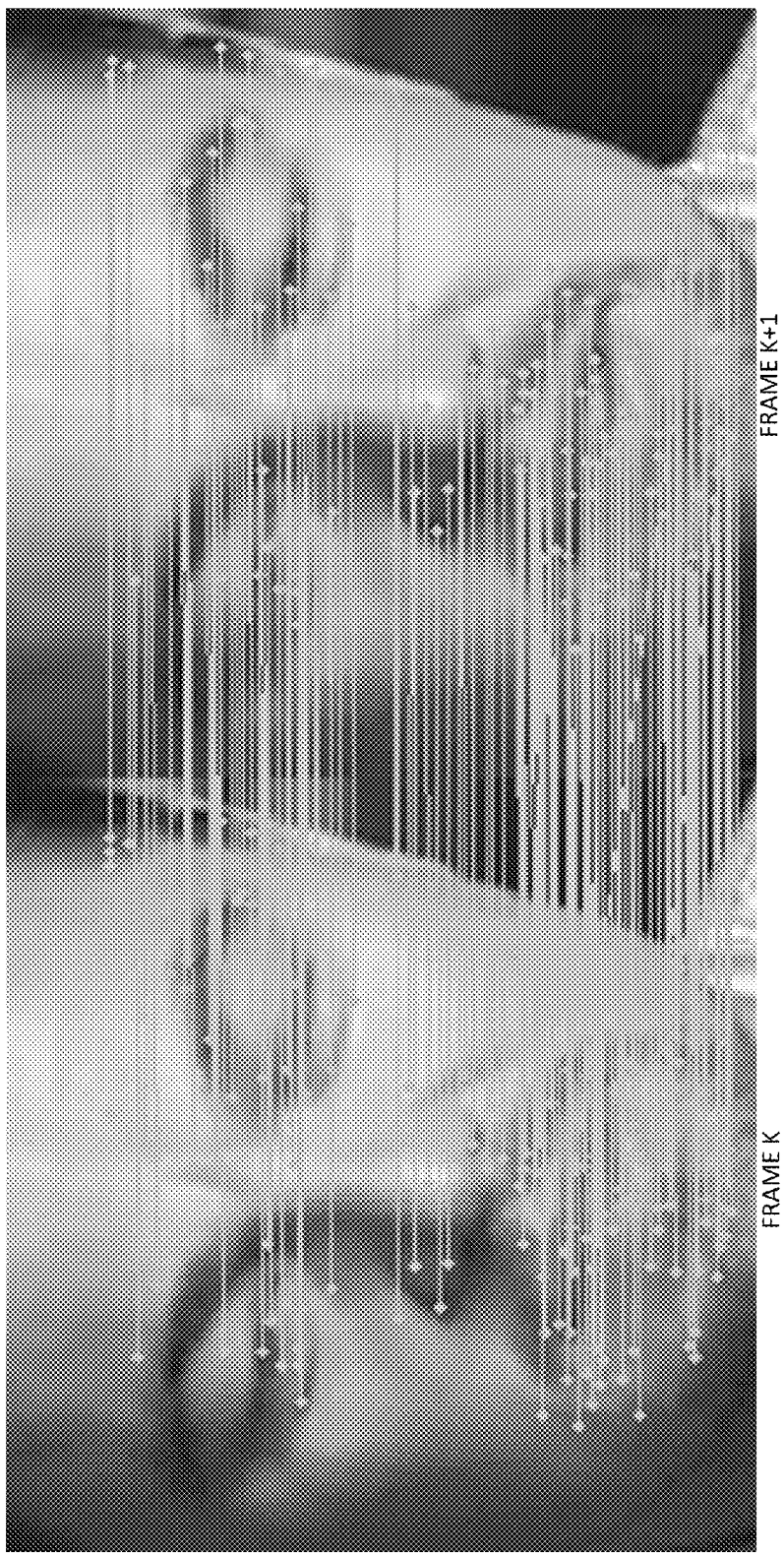
FIG. 5 illustrates feature matching.

Referring to FIG. 4, a key point refinement stage 130 may include tracking being performed between a pair (or more) of sequential frames 400. A suitable feature descriptor may be used to filter out false matches between the key points of the pair of sequential frames 400. For example, a scale invariant feature transform detector may be used to detect and describe local features in images. As another example, features from an accelerated test detector may be used to detect feature points and a binary robust independent elementary features descriptor may be used to describe local features. The local scale invariant feature transform feature may be used to stabilize the key points. Specifically, one or more features are extracted using the scale invariant feature transform or other descriptor near feature points in two frames 410. The features may be matched and false matches between feature points are filtered out 440 if the displacement between frames for a candidate match is larger than a threshold. Subsequently, the local transformation for each key point is calculated 420. Local transformation estimation may be computed by: within the pixel distance d for each key point, the shift of the x coordinate is the average shift of the feature points in the x direction, where the pixel distance may be selected to be 8 pixels. A similar estimate is computed for the shift of the y coordinate. The key points based upon the transformation estimation may be aligned 430. The local transformation estimated between frame K and frame K+1 from key points in frame K is applied to frame K+1 by adding up the estimated shift in the x and y directions. The result is more temporally stabilized key points. FIG. 5 illustrates an exemplary feature matching between adjacent frames for temporal stabilization.

To further improve the temporal consistency, in addition to the smoothing 120 and temporal tracking of key points 130, similar or identical candidates within a video segment are preferably selected for super resolution. Preferably, a histogram based optimal candidate selection 140 is used to select similar or identical candidates. In single frame based super resolution, candidate images in a database of semantic candidates may be selected as the best candidate for enhancement based on gradient maps. Namely, a score is computed between each semantic candidate image from the database and the region of the input image corresponding to the semantic component (for example a region around a human eye in the image). The score may be based on the difference of pixel values or pixel gradient values. While such a technique is appropriate for single images, for video super resolution, this process often causes temporal inconsistency since the adjacent frames could have selected a different candidate from the database of semantic candidates each of which has a different shape and color. This may be due to small changes in the pixel data of the frames or due to noise. In order to reduce the likelihood of inappropriately selecting different candidates from the database, temporally consistent candidates are preferably selected and applied to the video sequence. The process of selecting temporally consistent candidates may consider the frequency and matching strength of each semantic candidate over multiple frames.

Figure 6:
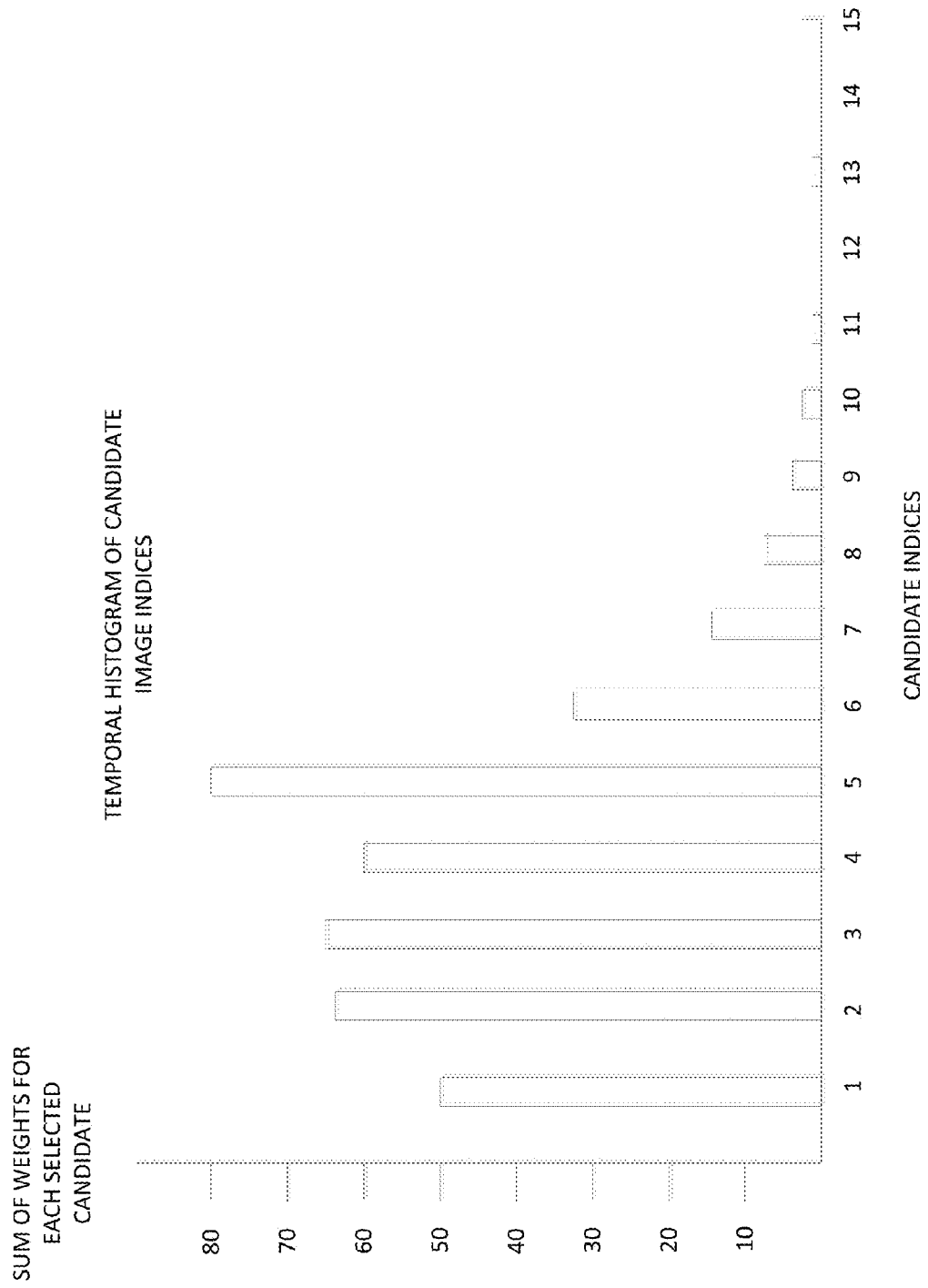
FIG. 6 illustrates a histogram of candidate image indices.

Referring to FIG. 6, for candidate based eye enhancement, the system may implement the following steps. The example is provided for eyes, but is equally applicable to other semantic components or objects in a video.

(1) For each frame with eyes, record the index of the selected top best matching 25 candidates in the database.

(2) For the ith candidate, calculate a weight w(i) by: w(i)=difference(1)/difference(i), where the difference(i) represents the difference score of this candidate and the difference (1) represents the difference score of the first candidate. Record the weights for selected candidates for multiple frames.

(3) For each selected candidate, sum up the weights over all the frames in a temporal window. The sum of weights for multiple candidates can be represented by a histogram and is used for ranking the candidates. The candidate with the highest sum of weights in the histogram is selected as the best candidate. Similar steps may be applied to frames with either open or closed eyes in human faces. It is noted that the state of the eyes (e.g., closed or open) can be distinguished by skin detection. For closed eyes, the eye image region includes a much higher ratio of skin pixels.

(4) For an individual frame, if the selected index is not in the indices of the top five candidates or if the difference score between the second candidate and the top candidate is larger than a certain threshold, the top one candidate for this frame will be utilized. This step introduces a proper tradeoff between the individual frame and temporal consistency over multiple frames.

For global temporally optimal candidate based enhancement, a large window of frames may be considered. For local temporally optimal candidate based enhancement, similar steps may be applied but within a smaller temporal window, such as with a length of 7.

Even with the aforementioned techniques to obtain semantic component alignment, it is desirable to include a pixel based re-alignment process 150 to further reduce the amount of temporal jitter in the video content. The key points tend to be generally consistent, but may not be sufficiently consistent from one frame to the next to sufficiently reduce the amount of jitter for a pleasurable viewing experience. For example, the viewer may still observe some temporal jitter since the system may not have fully utilized the important features contained in the specific objects or semantic components (for example pupils or highlights in facial regions). Instead of solely relying on the key points, it is desirable to also use information about the pixels in the region of the semantic (e.g., specific object) components (e.g., the eye) to perform re-alignment of the facial components (or other components). It may be observed that the re-alignment process may reduce temporal jitter. One technique to achieve pixel based re-alignment is as follows. First the system finds the best matching candidate from the database for the semantic component (e.g., eye). The initial alignment of the candidates with the input image may be defined by the key points. For the input image, the system may consider a small local search window around the image region (e.g., such as defined as eye). The system then performs template matching between the best matching candidate from the database and this local region to get a better approximation of the location or position of the semantic element (e.g., eye). The system may use a normalized cross-correlation measure to determine a matching score. Subsequently, the position of the candidate image region may be shifted according to the best matching locations for the semantic components (e.g., left eye and the right eye respectively).

Figure 7:
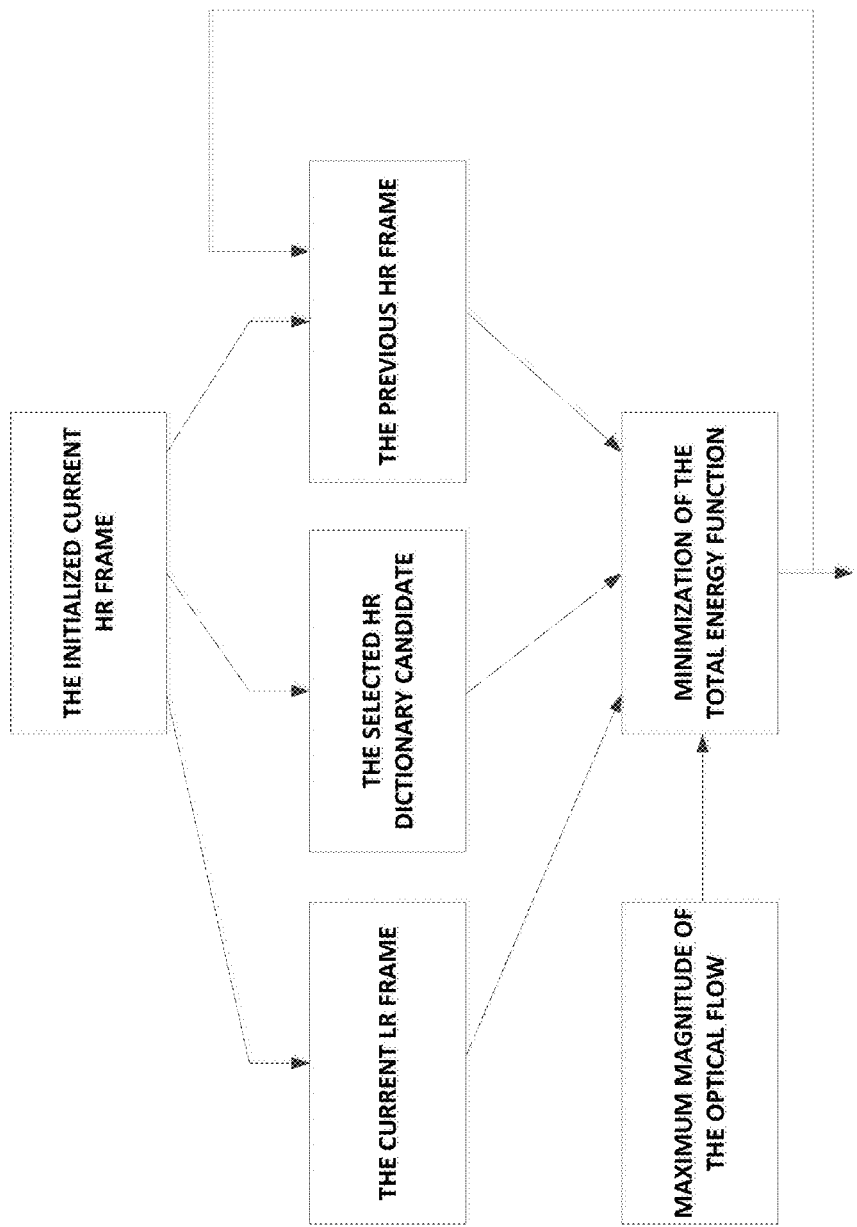
FIG. 7 illustrates high resolution image optimization including a temporal constraint.

Referring to FIG. 7, it is desirable to add further temporal stabilization constraints 160 in an image based optimization stage. Up till now, the system has included the stabilization techniques in the process of key point detection, optimal candidate selection, and realignment. The system may also apply temporal stabilization constraints in the optimization for the final super resolution image. The system may include an energy function optimization formulation including the temporal stabilization constraints as follows:

$$E(I_{h(t)}|I_{l(t)}, \nabla I_{d(t)}, \nabla I_{h(t-1)}) = E_i(I_{h(t)}|I_{l(t)}) + \beta E_g(\nabla I_{h(t)}|\nabla I_{d(t)}) + \alpha E_t(\nabla I_{h(t)}|\nabla I_{h(t-1)}).$$

In the above equation, $I_{h(t)}$ represents the reconstructed high resolution frame at the time stamp t, $I_{l(t)}$ represents the low resolution input frame at the time stamp t, $\nabla I_{d(t)}$ represents the selected candidate image from the dictionary in the gradient domain, $\nabla I_{h(t-1)}$ represents the previous reconstructed high resolution frame at the time stamp t−1. The system minimizes the energy function by enforcing the constraints in both the image domain (between the low resolution and high resolution frames) and gradient domain (between the current frame and the previous frame, between the reconstructed high resolution frame and the selected dictionary candidate), where $E_i(I_{h(t)}|I_{l(t)})$ is the reconstruction constraint in the image domain which measures the difference between the LR image and the smoothed and down sampled version of HR image. $E_g(\nabla I_{h(t)}|\nabla I_{d(t)})$ is the gradient constraint which requires that the gradient field of the recovered HR image should be close to the transformed HR gradient. $E_t(\nabla I_{h(t)}|\nabla I_{h(t-1)})$ represents the temporal stabilization constraints which enforces the similarity of the current frame and the previous frame in the gradient domain. Here β and α are suitable weights for the corresponding constraints. Information about the motion between subsequent frames may be used to control α (the weight on the temporal constraints) adaptively. The motion information may be based on calculating the maximum magnitude of optical flow between frames. Typically, when the motion between two frames is large, the weight on the temporal constraint is set to be small in order to avoid blur in the enhancement output image. When the motion between two frames is small, the weight on the temporal constraint is set to be high in order to strengthen the temporal stabilization. As illustrated in FIG. 7, the total energy function optimization may be implemented using a gradient descent technique. The optimization process may utilize an initial current high resolution frame, which may be computed by a suitable upscaling technique.

The terms and expressions which have been employed in the foregoing specification are used in as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method for increasing the resolution of a series of low resolution frames of a low resolution video sequence to a series of high resolution frames of a high resolution video sequence using an image processing system comprising:
   (a) receiving said series of low resolution frames of said low resolution video sequence by said image processing system;
   (b) determining a first plurality of key points of a first low resolution frame of said series of low resolution frames based upon semantic content of said first low resolution frame of said series of low resolution frames by said image processing system;
   (c) determining a second plurality of key points of a second low resolution frame of said series of low resolution frames based upon semantic content of said second low resolution frame of said series of low resolution frames by said image processing system;
   (d) temporally processing said first plurality of key points based upon said second plurality of key points by said image processing system to determine a more temporally consistent set of key points for said first plurality of key points to determine said series of high resolution frames of a high resolution video sequence.

2. The method of claim 1 wherein said temporal processing is based upon a respectively plurality of key points of a plurality of said low resolution frames temporally prior to said first low resolution frame, and a respective plurality of key points of a plurality of said low resolution frames temporally after said first low resolution frame, where each of said plurality of key points for said temporally prior to and said temporally after are determined independent of any other low resolution frame.

3. The method of claim 2 wherein said temporal processing is free from using motion information of said series of low resolution frames of said low resolution video sequence.

4. The method of claim 1 wherein said temporal processing includes key point tracking between said first low resolution frame and said second low resolution frame.

5. The method of claim 4 wherein said key point tracking is based upon matching local image feature descriptors.

6. The method of claim 5 wherein said local image feature descriptors are extracted from said first low resolution frame and said second low resolution frame.

7. The method of claim 6 wherein said descriptor matching includes filtering out false positives.

8. The method of claim 1 further comprising selecting a candidate from a dictionary for increasing said resolution of said first low resolution frame based upon a histogram of candidate indices.

9. The method of claim 8 wherein said selecting is based upon a weighted sum of occurrences of said candidate indices over multiple frames of said video sequence.

10. The method of claim 1 further comprising modifying a position of a candidate image based upon a pixel based re-alignment process.

11. The method of claim 10 wherein said pixel based re-alignment process is based upon template matching.

12. The method of claim 11 wherein said modification is based upon selecting a candidate image from a dictionary.

13. The method of claim 1 further comprising including a temporal stabilization constraint for increasing said resolution of said first low resolution frame.

14. The method of claim 13 wherein said temporal stabilization constraint is based upon optimizing an energy function.

15. The method of claim 14 wherein said energy function further includes constraints based on an image domain and a gradient domain.

16. The method of claim 15 wherein said temporal stabilization constraint is modified based upon motion information between a plurality of frames.

* * * * *